US009100397B2

(12) United States Patent
Li et al.

(10) Patent No.: US 9,100,397 B2
(45) Date of Patent: Aug. 4, 2015

(54) BACNET MS/TP AUTOMATIC MAC ADDRESSING

(75) Inventors: Ting Li, Beijing (CN); Yongxi Zhou, Beijing (CN); Hu Zou, Beijing (CN); Jianping Chen, Beijing (CN); John Zhang, Beijing (CN)

(73) Assignee: Honeywell International Inc., Morristown, NJ (US)

( * ) Notice: Subject to any disclaimer, the term of this patent is extended or adjusted under 35 U.S.C. 154(b) by 565 days.

(21) Appl. No.: 13/555,980

(22) Filed: Jul. 23, 2012

(65) Prior Publication Data

US 2014/0025842 A1    Jan. 23, 2014

(51) Int. Cl.
| | | |
|---|---|---|
| G06F 15/16 | (2006.01) | |
| H04L 29/06 | (2006.01) | |
| H04L 29/08 | (2006.01) | |
| H04L 12/417 | (2006.01) | |
| H04L 29/12 | (2006.01) | |
| H04L 12/24 | (2006.01) | |

(52) U.S. Cl.
CPC .......... *H04L 63/0876* (2013.01); *H04L 12/417* (2013.01); *H04L 29/12254* (2013.01); *H04L 41/08* (2013.01); *H04L 61/103* (2013.01); *H04L 61/2038* (2013.01); *H04L 61/6022* (2013.01); *H04L 67/125* (2013.01)

(58) Field of Classification Search
CPC ................ H04L 67/125; H04L 12/417; H04L 29/12254; H04L 61/2038
USPC .......................................... 709/208, 245, 251
See application file for complete search history.

(56) References Cited

U.S. PATENT DOCUMENTS

| | | |
|---|---|---|
| 5,249,269 A | 9/1993 | Nakao et al. |
| 5,654,531 A | 8/1997 | Farabee et al. |
| 5,831,546 A | 11/1998 | Costa et al. |
| 6,901,439 B1 | 5/2005 | Bonasia et al. |
| RE38,812 E | 10/2005 | Acres et al. |

(Continued)

FOREIGN PATENT DOCUMENTS

GB    2456688 B    8/2011

OTHER PUBLICATIONS

"Appendix E-Derived Network Addressing", Delta Controls, ORCAview Version 3.30 Technical Reference Manual, Rev. 1.30, Original p. E-1, 39 pages, prior to Nov. 30, 2011.

(Continued)

*Primary Examiner* — Hieu Hoang
(74) *Attorney, Agent, or Firm* — Seager Tufte & Wickhem LLC.

(57) ABSTRACT

A building automation and control network (BACnet) master-slave/token-passing (MS/TP) automatic media access control (MAC) addressing system having a BACnet MS/TP network, a MAC assigner on the network, and one or more MAC assignees on the network. Each assignee may have a global unique identity (GUID) and the assigner may have a predefined address. The assigner may gather virtually all GUIDs of the MAC assignees on the network and gather virtually all unused MAC addresses on the network. The assigner may map GUIDs to the unused MAC addresses and send a resulting map to the MAC assignees for assignment of a MAC address to each assignee. Each assignee may be assigned a MAC address according to its GUID, and the assignment of a MAC address to each assignee may occur automatically without manual intervention. In other words, the system may provide auto MAC addressing.

25 Claims, 4 Drawing Sheets

(56) References Cited

U.S. PATENT DOCUMENTS

| | | |
|---|---|---|
| 7,035,951 B2 | 4/2006 | Bui et al. |
| 7,069,345 B2 | 6/2006 | Shteyn |
| 7,359,989 B2 | 4/2008 | Orava et al. |
| 7,987,247 B2 | 7/2011 | Westphal et al. |
| 8,050,801 B2 | 11/2011 | Richards et al. |
| 2002/0196761 A1 | 12/2002 | Kaneko |
| 2004/0111501 A1 | 6/2004 | Lee et al. |
| 2009/0271001 A1* | 10/2009 | Westphal et al. .......... 700/3 |
| 2009/0287736 A1* | 11/2009 | Shike et al. ............ 707/103 R |
| 2009/0307255 A1* | 12/2009 | Park ........................ 707/102 |
| 2009/0312853 A1* | 12/2009 | Kore et al. ................. 700/90 |
| 2010/0286799 A1* | 11/2010 | Matsen et al. .............. 700/90 |
| 2012/0143378 A1* | 6/2012 | Spears et al. .............. 700/275 |
| 2012/0221746 A1* | 8/2012 | Grinberg ...................... 710/3 |
| 2013/0086195 A1* | 4/2013 | Hiniker ....................... 709/208 |
| 2013/0094352 A1* | 4/2013 | Bouhal et al. .............. 370/225 |

OTHER PUBLICATIONS

"BACnet Protocol Implementation Conformance Statement", Delta Controls, Delta ORCAview 3.30, Aug. 14, 2003.

"MSTP Auto-Addressing", 7 pages, Apr. 15, 2008.

Cheng et al., "Enhancement of Token Bus Protocols for Multimedia Applications", IEEE, IBM T.J. Watson Research Center, 1063-639019, p. 30-36, 1993.

Kastner et al., "Communication Systems for Building Automation and Control", Proceedings of the IEEE, vol. 93, No. 6, p. 1178-1203, Jun. 2005.

\* cited by examiner

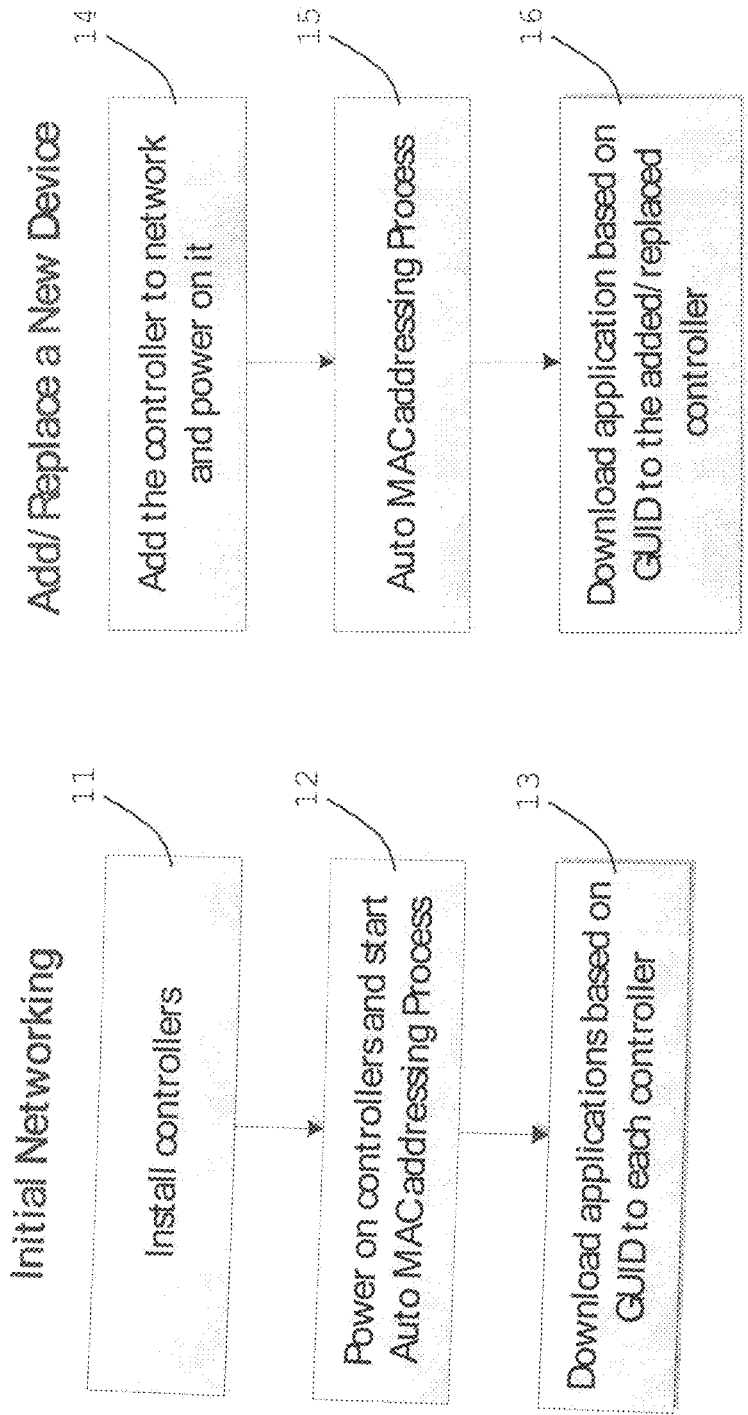

US 9,100,397 B2

BACNET MS/TP AUTOMATIC MAC ADDRESSING

BACKGROUND

The present disclosure pertains to automation systems and particularly to communications of an automation system.

SUMMARY

The disclosure reveals a building automation and control network (BACnet) master-slave/token-passing (MS/TP) automatic media access control (MAC) addressing system having a BACnet MS/TP network, a MAC assigner on the network, and one or more MAC assignees on the network. Each assignee may have a global unique identity (GUID) and the assigner may have a pre-defined address. The assigner may gather virtually all GUIDs of the MAC assignees on the network and gather virtually all unused MAC addresses on the network. The assigner may map GUIDs to the unused MAC addresses and send a resulting map to the MAC assignees for assignment of a MAC address to each assignee. Each assignee may be assigned a MAC address according to its GUID, and the assignment of a MAC address to each assignee may occur automatically without manual intervention. In other words, the system may provide auto MAC addressing.

BRIEF DESCRIPTION OF THE DRAWING

FIG. 1 is a diagram of the commissioning process with auto MAC addressing for initial networking;

FIG. 2 is a diagram of the commissioning process with auto MAC addressing for adding or replacing a new device;

DESCRIPTION

Figure 3:
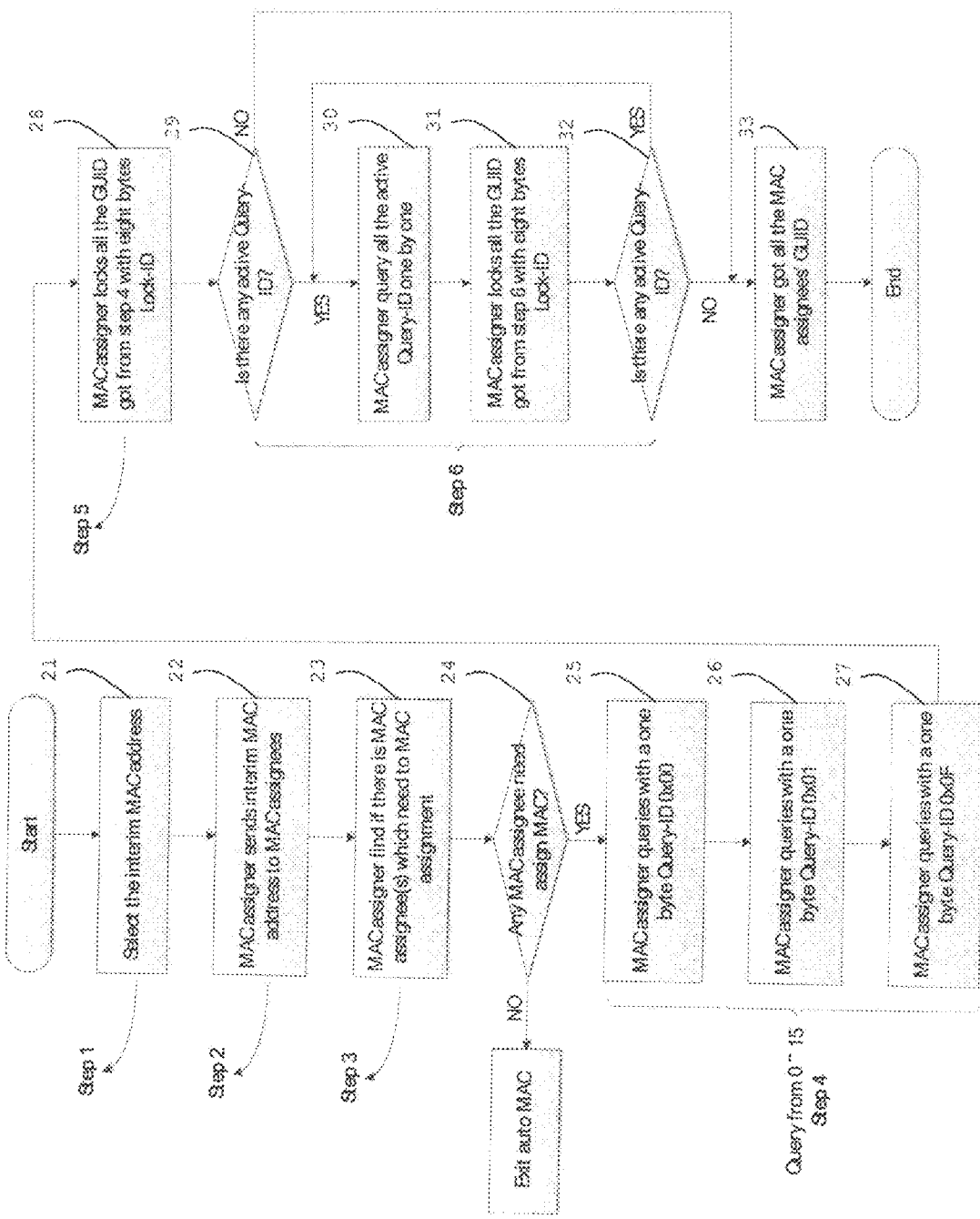
FIG. 3 is a diagram of an auto MAC addressing solution.

BACnet, an ASHRAE building automation and control networking protocol, may be used in various building control systems. In the systems, master slave/token passing (MS/TP) via EIA-485 bus appears very popular for a unitary controller. MS/TP may require a MAC address for each of the nodes in the network.

A general way to set up a MAC address is to install switches to configure the MAC address manually. There will be some disadvantages. First, a MAC address configuration may have to be done manually, which will increase installation cost and also introduce the chance of configuration error (which means the same MAC address is configured for different controllers in the same network). When a configuration error happens, trouble shooting may cause extra large efforts for a field technician.

Second, the switches may increase the cost of the hardware. To eliminate the disadvantages, a technique which can automatically assign MAC address to every device in the same MS/TP network may be used. This technique may meet both the scenarios of initial construction of the network and of some new devices joining the existing network.

With this approach, the commissioning efforts (both of installation and trouble shooting efforts) of a field engineer may be reduced. The approach may divide all of the devices on the same MS/TP network into two parts, a MAC assigner and MAC assignees. In each MS/TP network, there may be one MAC assigner that takes a responsibility to assign MAC addresses to MAC assignees.

The MAC assigner may have a pre-defined MAC address. The MAC assignees may have native GUIDs (global unique identities). A GUID needs to be unique for all of the MAC assignees. The generation and assignment of GUIDs may be done at a factory production stage, so that when production of the assignees is finished, each MAC assignee should have GUID.

Generally, there may be 5 steps for the auto MAC addressing process as follows. 1) A MAC assigner may get all of the GUIDs of MAC assignees on the network. 2) The MAC assigner may get all of the unused MAC addresses at the network. 3) The MAC assigner may map GUIDs to unused MAC addresses. 4) The MAC assigner may send the map to MAC assignees. 5) The MAC assigner may check the network to ensure that the MAC addresses are assigned properly.

In the present approach, each MS/TP device may have a native GUID (global unique identity). Through a process of gathering all of the devices' GUIDs on MS/TP network and creating a map between GUID and MAC address, a map may be sent assigning a MAC address to specific device. A MAC address configuration on an MS/TP network may be automatically run without human interference.

A plant controller may have a pre-defined MAC address 0 on MS/TP network, while all unitary controllers may already have GUIDs from factory production. Various tools may be used as a user interface (UI) to trigger an auto MAC addressing process. The UI may be also used to erase the assigned MAC addresses for MAC assignees.

With the present approach, one may remove two rotary switches (used to manually assign a MAC address) from a unitary controller, which can save cost for each unit. And also, the present approach may reduce the commissioning efforts (both of installation and trouble shooting efforts) of a field engineer.

One may note an overview of the present approach. Virtually all of the devices at one MS/TP network may be divided into two types—MAC assigner and MAC assignee. In each MS/TP network, there may be just one MAC assigner, which may take the responsibility to assign MAC addresses to MAC assignees. The MAC assigner may always have a pre-defined MAC address, for example, 0. Virtually all of the MAC assignees may have a 64 bit (8 byte) global unique identity (GUID). The MAC assigner may gather virtually all of the GUIDs of MAC assignees. The MAC assigner may listen to MS/TP network to gather virtually all of the unused MAC addresses. The MAC assigner may map GUIDs to unused MAC addresses. The MAC assigner may send the map to MAC assignees. The MAC assigner may check the network to verify that the MAC address is assigned properly. After successful assignment of MAC addresses, the MAC assignees may lock the MAC addresses into their NVMs (nonvolatile memories), respectively, and then restart to make the assigned MAC addresses take effect.

An auto MAC addressing process may start at a regular time or it may be triggered manually, so that it can handle a scenario in which a new MAC assignee wants to join network. An approach may be provided to erase an assigned MAC address of a MAC assignee, so that the MAC assignee can join another BACnet MSTP network.

Details of the present approach may be noted in the following. In the above noted approach, the "MAC assigner gathers all the GUIDs of MAC assignees" is the key step. Generally, there may be two approaches to implement this step. One may be that the MAC assignee's GUID is input manually, which means that this step is done offline. Another approach may be that the MAC assigner may provide a UI to a user to implement this step.

The MAC assigner may gather virtually all of the GUIDs on BACnet MSTP automatically. To gather all the GUIDs on BACnet MSTP automatically, there are two approaches that are described in the following. If the step, the "MAC assigner gathers all the GUIDs of MAC assignees", is implemented manually, an auto MAC addressing process may be started manually. Normally, when new MAC assignees want to join the network, a user may input their GUIDs to a MAC assigner, and then start the process to assign MAC addresses to them.

If the step, the "MAC assigner gathers all the GUIDs of MAC assignees", is implemented automatically, two approaches to start auto MAC addressing process may be as follows. The user may manually start the process. The MAC assigner may provide a UI to user to implement this step.

The MAC assigner may start the process in a regular amount of time. At the beginning of the process, the MAC assigner may detect if there are new comers who need MAC addresses. If yes, the MAC assigner may start the process. After the MAC address is assigned, there may be a scenario in which a MAC assignee wants to join another BACnet MS/TP network; so it may need to be re-assigned a MAC address. To satisfy this scenario, the MAC assigner may initialize a particular request to that MAC assignee. Upon receipt of the request, the MAC assignee may erase its MAC address (it is just like back to factory default status).

A solution may gather GUIDs on the MS/TP. Step 1 may incorporate the following. One MAC address may be selected as an interim MAC address. This interim MAC address may have a range from about 128 to 254. In all of the auto MAC addressing process, the interim MAC address may be used as the MAC address for all of the MAC assignees.

Two approaches may be used to select the interim MAC address. One, a MAC address may be reserved as interim MAC address. All the MAC assignees may have this reserved MAC address. Second, the MAC assigner may select one of the unused MAC addresses in network as interim MAC address. It may test the existence of device with MAC addresses 128, 129, . . . , 254 respectively, and use the MAC address of the first absence device.

Step 2 may incorporate a MAC assigner initializing a broadcast with an interim MAC address. Virtually all of the MAC assignees may receive the interim MAC address. Since an interim MAC address may have a range from 128 to 254, all of the MAC assignees may act as slave devices, which means all the MAC assignees will not necessarily get token (so that they will not initialize any message on MSTP) and they can only reply to a request from the MAC assigner.

Step 3 may incorporate the MAC assigner checking if the auto MAC addressing process needs to be started. If it needs to be started, then one may continue with a next step. Step 4 may incorporate the MAC assigner issuing a serial no. of a proprietary query request for an interim MAC address. In this request, a query-identity (value ranging from about 0 to 0x0F) may be contained. It may request that all of the MAC assignees, whose GUID or a portion of the GUID matches a query-identity (ID), to report their GUIDs to the MAC assigner.

After sending this request, the MAC assigner may hold token to wait for a reply for 250 ms, whether or not the MAC assigner received a invalid frame (which means that there is a conflict) or received a valid frame (which means that it gets a GUID). The MAC assigner may wait 250ms. The MAC assigner may maximize the usage of one request. In one request, the MAC assigner may have a chance to get several GUIDs.

To implement above step, a little modification on a BACnet master node state machine may be required. Since one may use a proprietary MS/TP frame type, it will not necessarily cause an impact on the existing BACnet MS/TP.

Upon receiving the above proprietary query request, virtually all of the MAC assignees may wait a random time and then reply. The random time may range from about 0 to 250 ms. The random time may be generated based on a GUID to minimize conflict on the MSTP. And the random time may be generated based on the time used to send this reply (e.g., if the time used for this reply message is 10 ms, then the random time may be a multiple of 10 ms).

For each query, there may be three scenarios. 1) If no MAC assignee matches a query-ID, then the MAC assigner will not necessarily receive a reply. 2) If only one MAC assignee matches a query-ID, then the MAC assigner will get this MAC assignee's GUID. 3) If multiple MAC assignees match a query-ID, then there may be three scenarios for MAC assigner. A) If it only receives a conflict message, then the MAC assigner will not necessarily get an invalid GUID. B) If it receives several messages without a conflict, then the MAC assigner may get several valid GUIDs. C) If there is a combination of scenarios A) and B), then the MAC assigner may get one or more valid GUIDs.

In scenarios 1) 2) and 3B), the MAC assigner may get all of the matched GUIDs. Then the query for this query-ID may be finished and the query-ID may enter an inactive state.

In scenario 3C), the MAC assigner may get some of matched GUIDs. If so, then it may need another cycle of a query for this query-ID. Thus, this query-ID may still be in an active state.

In scenario 3A), if the MAC assigner did not get any GUIDs, then it may need another cycle of query for this query-ID. Thus, this query-ID may still be in an active state.

Step 5 may be as follows. The MAC assigner may initialize a serial of not expecting reply to a request for an interim MAC address, to lock all the gathered GUIDs. In each of the requests, an eight-byte lock-ID may be contained. A lock-ID is same with one of the gotten GUIDs). Upon receiving this request, the MAC assignee may compare the lock-ID and the GUID. If they are match, the MAC assignee may enter the lock states, which means that it will not reply to the further loop of query.

Step 6 may be as follows. The MAC assigner may initialize another loop of query for all the active query-IDs until all the query-IDs enter inactive states, which means that the MAC assigner has got all the MAC assignees' GUIDs.

Another solution may be used to gather GUIDs on the MS/TP. Step 1 to step 3 may be the same as those steps for the previously noted solution. Step 4 may be as follows. A MAC assigner may issue a proprietary GUID enrollment request to MAC assignees and then wait for a reply. At this moment, the MAC assigner may hold the token. Upon receiving the above proprietary request, a MAC assignee may wait a random amount of time and then reply. The random time may be generated based on the GUID and should be within 250 ms. Before reaching its random time, the MAC assignee may listen to the MS/TP network. If any message is received (it means some other MAC assignees have already send a reply), then it may relinquish itself reply and wait for another enrollment request.

There may be a chance that multiple MAC assignees select the same random time, and that this random time has a minimum value. This means that this is the earliest time to send reply. Only in this scenario, there may be conflicts in MS/TP network.

The MAC assigner may listen to the MS/TP network for the reply. If it receives an invalid message, which means that there are multiple MAC assignees to reply at the same time, then this enrollment failed to get any useful information. If it receives a valid message, which means a GUID is got, then the MAC assigner may lock this MAC assignee with the GUID.

Step 4 may be repeated until the MAC assigner can not receive anything. This means that all the GUIDs are locked and the MAC assigner obtained all the MAC assignees' GUIDs.

A MAC assigner may be selected. Both a plant controller and a unitary controller may be a MAC assigner. First, one may select a plant controller as the MAC assigner. A plant controller may be used as a MAC assigner. It may have a pre-defined MAC address 0 at the MS/TP network.

Unitary controllers may be used as MAC assignees. They may have already received GUIDs at the factory production stage. In an auto MAC addressing process, the plant controller may assign MAC addresses to unitary controllers. The plant controller may try to get all the GUIDs of unitary controllers on the same MS/TP network. The plant controller may try to get all of the unused MAC addresses on the same MS/TP network. The plant controller may map the GUIDs with unused MAC addresses. The plant controller may send the map to the unitary controllers. The plant controller may check the network to ensure that MAC address assignment is successful. After the auto MAC addressing process, the map between GUID and MAC address may be created and displayed to user through a tool.

To satisfy the scenario in which a new unitary controller wants to join the network, auto MAC addressing may be trigged by a regular time interval or it can be trigged by a tool. To satisfy the scenario in which a unitary controller (already having been assigned a MAC address) wants to join another network, the plant controller (trigged by the tool) may erase the MAC address of this unitary controller. With this approach, two rotary switches (used to manually assign MAC addresses) may be removed from the unitary controller, which can save the cost for each unit. And also, this approach may save the commissioning efforts (both of installation and trouble shooting efforts) of a field engineer.

A unitary controller may be a MAC assigner. Unitary controllers may already have received GUIDs at the factory production stage, and they may be defaulted as MAC assignees. One of the unitary controllers may be designated as MAC assigner by a studio, and the studio may manually assign one MAC address to this unitary controller.

In the auto MAC addressing process, a MAC assigner may assign MAC addresses to MAC assignees. MAC assigner may try to get all of the GUIDs of MAC assignees on the same MS/TP network. The MAC assigner may try to get all of the unused MAC addresses on the same MS/TP network. The MAC assigner may map GUIDs with unused MAC addresses. The MAC assigner may send the map to the MAC assignees. The MAC assigner may check the network to ensure that MAC address assignment process has been successful.

After the auto MAC addressing process, the map between GUID and MAC address may be created and displayed to user through the studio. To satisfy the scenario in which a new unitary controller wants to join network, auto MAC addressing may be trigged by a regular time interval or it may be trigged by the studio. To satisfy the scenario in which a unitary controller (already having been assigned a MAC address) wants to join another network, the studio may erase the MAC address of this unitary controller. With this approach, two rotary switches (used to manually assign a MAC address) may be removed from the unitary controller, which can save costs for each unit. And also, this approach may save the commissioning efforts (both of installation and trouble shooting efforts) of a field engineer.

The present system and approach, as described herein and/or shown in the Figures, may incorporate one or more processors, computers, controllers, user interfaces, wireless and/or wire connections, and/or the like, wherever desired.

In the following, descriptions of the present system or approach may be illustrated by FIGS. 1-4. FIG. 1 is a diagram of the commissioning process with auto MAC addressing for initial networking. Controllers may be installed at symbol 11. At symbol 12, the controllers may be powered-on and the auto MAC addressing process may be started. At symbol 13, applications based on a GUID to each controller may be downloaded.

FIG. 2 is a diagram of the commissioning process with auto MAC addressing for adding or replacing a new device. A controller may be added to a network and be powered-on at symbol 14. At symbol 15, an auto MAC addressing process may occur. At symbol 16, an application based on the GUID to the added or replaced controller may be downloaded.

FIG. 3 is a diagram of an auto MAC addressing solution. After starting, the interim MAC address may be selected at symbol 21 as a step 1. Step 2 at symbol 22 may be where a MAC assigner sends the interim MAC address to the MAC assignees. The MAC assigner may find if there is one or more MAC assignee(s) which need a MAC assignment at step 3 of symbol 23.

At symbol 24, one may ask a question of whether any MAC assignee needs to be assigned a MAC. If the answer is no, then exit from auto MAC. If the answer is yes, then step 4 at symbols 25-27 may occur with a query from 0 to 15. An example query may be one byte, although it could involve another number of bytes. The MAC assigner may query with a one byte-ID (0x00) at symbol 25. At symbol 26, the MAC assigner may query with a one byte query-ID 0x01. The MAC assigner may query with a one byte query-ID 0x0F at symbol 27.

A step 5 may occur at symbol 28 where the MAC assigner may lock all of the GUIDs obtained from step 4 with an 8 byte lock-ID. Step 6 may be indicated at symbols 29-32. At a symbol 29, a question of whether there is any active query ID may be asked. If not, then it may be determined that the MAC assigner obtained all of the MAC assignees' GUIDs as indicated at symbol 33. If the answer is yes, then at symbol 30, the MAC assigner may query all of the active query-IDs one by one. The MAC assigner may lock all of the GUIDs obtained from step 6 with eight byte lock-IDs at symbol 32. At symbol 32, the question if there is any active query ID may be asked. If the answer is yes, then the items at symbols 30-32 may be repeated until an answer at symbol 32 is no. Upon no for an answer, then it may be determined that the MAC assigner obtained all of the MAC assignees' GUIDs as indicated at symbol 33.

Figure 4:
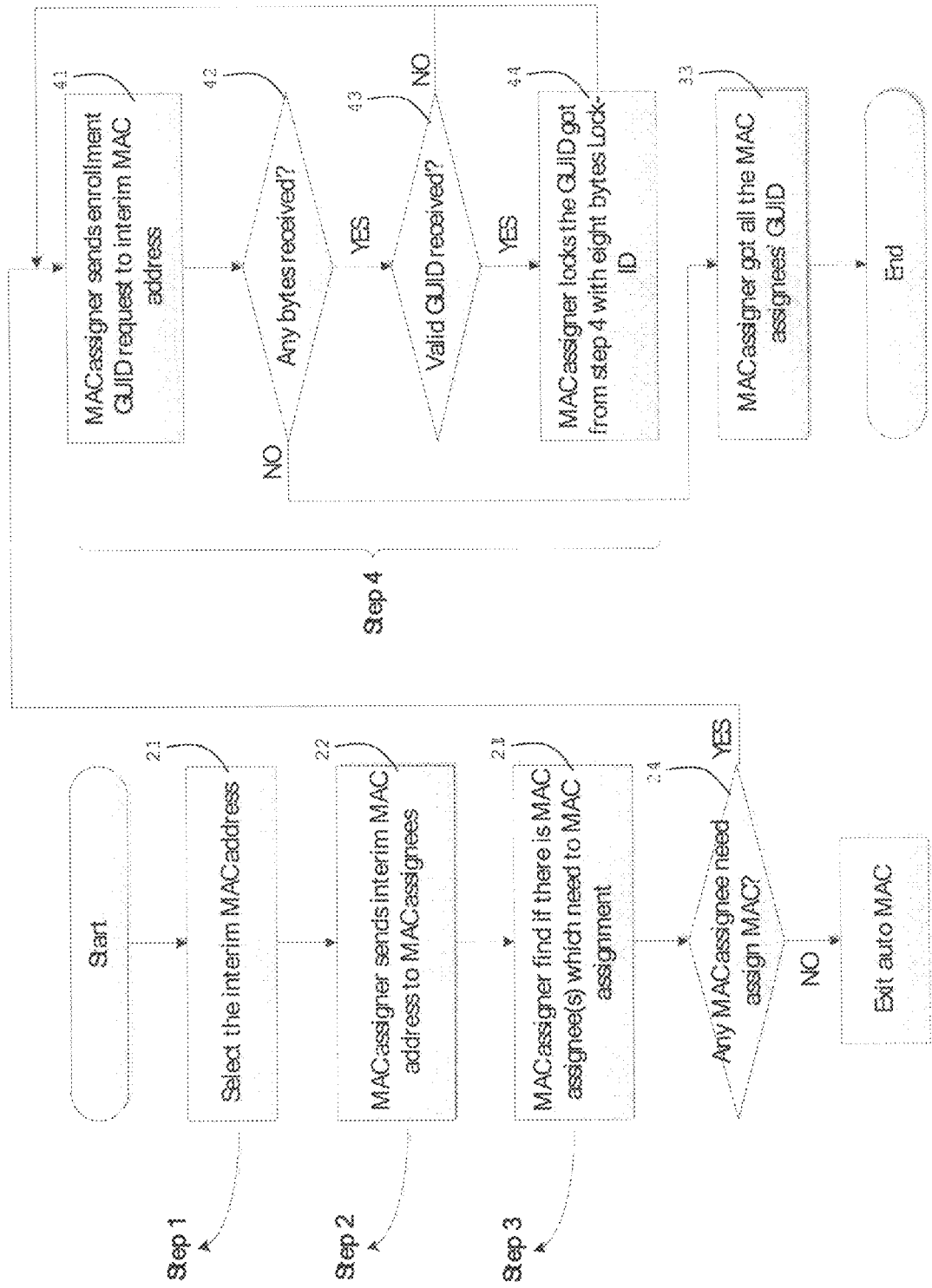
FIG. 4 is a diagram of another auto MAC addressing solution.

FIG. 4 is a diagram of another auto MAC addressing solution. After starting, the interim MAC address may be selected at symbol 21 as a step 1. Step 2 at symbol 22 may be where a MAC assigner sends the interim MAC address to the MAC assignees. The MAC assigner may find if there is one or more MAC assignee(s) which need a MAC assignment at step 3 of symbol 23.

At symbol 24, one may ask a question of whether any MAC assignee needs to be assigned a MAC. If the answer is no, then exit from auto MAC. If the answer is yes, then step 4 at symbols 41-44 may occur. The MAC assignee may send an enrollment GUID request to an interim MAC address at symbol 41. At symbol 42, a question as to if any bytes were received may be asked. If the answer is no, then it may be determined that the MAC assigner obtained all of the MAC assignees' GUIDs. If the answer is yes, then a question of if a valid GUID was received at symbol 43. If the answer is no, then the items at symbols 41-42 may be repeated with an answer of no at symbol 42 or an answer of yes at symbol 42. If the answer at symbol 42 again is yes, then the question of if a valid GUID was received at symbol 43. If the answer at symbol 43 is yes, then the items at symbols 41-42 or 41-43 may be repeated. If the answer at symbol 43 is yes, then the MAC assigner may lock the GUIDs obtained from step 4 with eight byte lock IDs at symbol 44. After symbol 44, the items of symbols 41-42, 41-43 or 41-44 may be repeated until a no is the answer to the question at symbol 42. If the latter is the response, then it may be determined that the MAC assigner obtained all of the MAC assignees' GUIDs.

The auto MAC addressing solutions in the diagrams of FIGS. 3 and 4 are some illustrative examples. The solutions may be different in the sense of the number of steps, the arrangement of steps, the details of the steps, and so forth.

Figure 5:
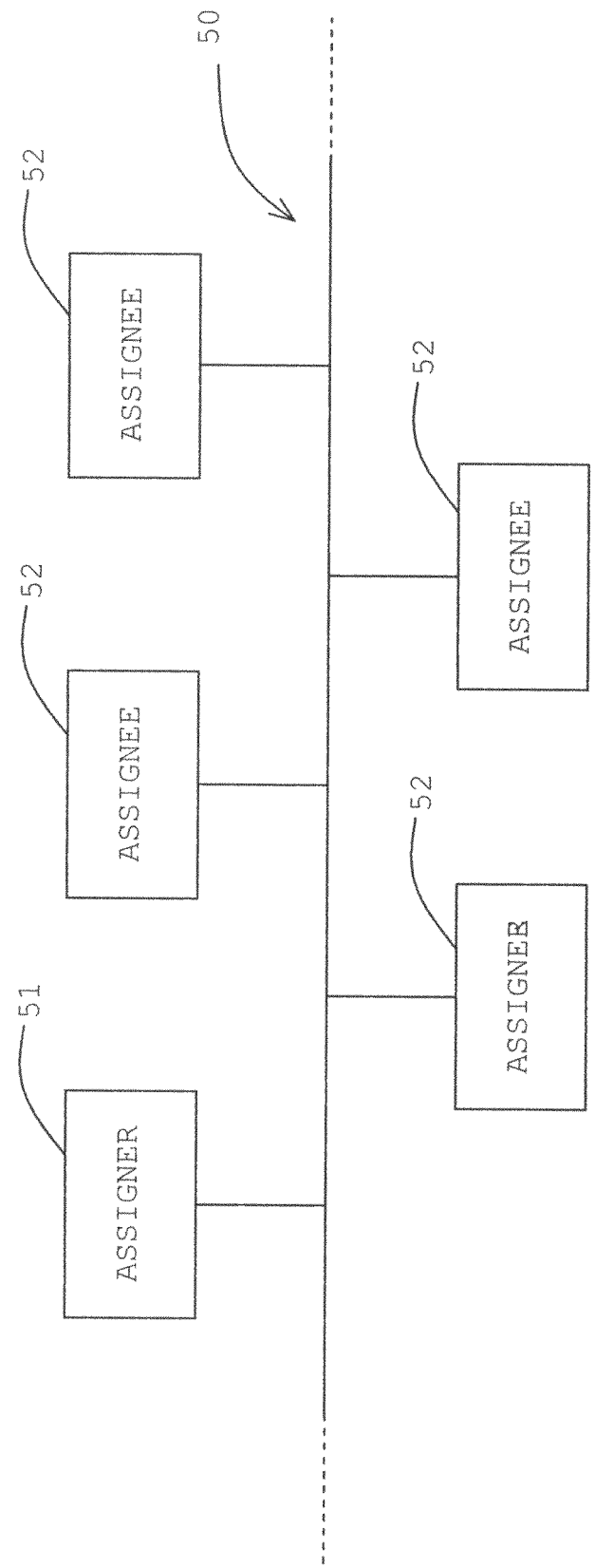
FIG. 5 is a diagram of an assigner and assignees on a network.

FIG. 5 is a diagram of an assigner 51 and assignees 52 on a network 50.

To recap, a building automation and control network (BACnet) master-slave/token-passing (MS/TP) automatic media access control (MAC) addressing system may incorporate a BACnet MS/TP network, a MAC assigner on the network and one or more MAC assignees on the network. Each assignee may have a global unique identity (GUID). The assigner may have a pre-defined address. The assigner may gather virtually all GUIDs of the MAC assignees on the network. The assigner may gather virtually all unused MAC addresses on the network. The assigner may map GUIDs to the unused MAC addresses. The assigner may send a resulting map to the MAC assignees for assignment of a MAC address to each assignee.

Each assignee may be assigned a MAC address according to its GUID. The assignment of a MAC address to each assignee may occur automatically without manual intervention. The assigner may check the network to verify that the MAC addresses are assigned properly.

One device may be designated as a MAC assigner and the other devices may be designated as MAC assignees. Each of the assignees may lock a MAC address into a memory. Each MAC assignee may be restarted to make the MAC address take effect. The assigner may gather virtually all of the GUIDs of the MAC assignees automatically.

One MAC address may be selected as an interim MAC address. The interim MAC address may be a MAC address for virtually all MAC assignees. A MAC assignee may act as a slave device. Slave devices cannot necessarily initialize a message on the network and can only reply to a request from the MAC assigner.

The assigner may issue a series of query requests to assignees having an interim address. Each query request may incorporate a query-ID. The query-ID may request virtually all MAC assignees whose GUID or a portion of the GUID matches the query-ID to report their GUIDs to the assigner.

The MAC assigner may issue a GUID enrollment request to MAC assignees. Upon receipt of the request, a MAC assignee may wait for a random amount of time and then send a reply. During the random amount of time, the MAC assignee may listen to the BACnet MS/TP network for a reply by another MAC assignee, of which if there is a reply by another MAC assignee, then the MAC assignee may cancel the reply.

An approach for automatic addressing may incorporate providing a media access control (MAC) assigner, having a pre-determined MAC address, on a building automation and control network (BACnet) master-slave/token-passing (MS/TP) network, and providing one or more MAC assignees, having global unique identities, on the BACnet MS/TP network. The MAC assigner may gather the GUIDs of the MAC assignees. The MAC assigner may gather the unused MAC addresses from the BACnet MS/TP network. The MAC assigner may map GUIDs to unused addresses into a map. The MAC assigner may send the map to the MAC assignees as an assignment of a MAC address to each MAC assignee. The MAC assigner may verify that the MAC addresses are properly assigned. After assignment of the MAC addresses, the MAC assignees may lock their MAC addresses into their respective memories.

The approach may further incorporate adding a new MAC assignee to the BACnet MS/TP network. The MAC assigner may gather the GUID from the new MAC assignee. The MAC assigner may gather an unused MAC address from the BACnet MS/TP network. The MAC assigner may map the GUID of the new MAC assignee to the unused MAC address into a map. The MAC assigner may send the map to the new MAC assignee. The MAC assigner may check the BACnet MS/TP network to verify that the MAC address is properly assigned. The new MAC assignee may lock the MAC address into its memory.

The MAC assigner may gather the GUIDs on the BACnet MS/TP network automatically. Virtually all of assignees' GUIDs may be manually input to the MAC assigner.

Gathering GUIDs on the BACnet MS/TP may incorporate the MAC assigner selecting an unused MAC address in the BACnet MS/TP network as an interim MAC address for virtually all of the MAC assignees. The MAC assigner may issue a query to assignees having the interim MAC address. The query may request MAC assignees, having at least a portion of their GUID matching a query-ID, to report their GUIDs to the MAC assigner.

If the MAC assigner gets virtually all of the matched GUIDs, then the query for the query-ID may be complete and the query-ID may enter an inactive state. If the MAC assigner gets some matched GUIDs, then the MAC assigner may need another cycle of the query for the query-ID and the query-ID may be still at an active state. If the MAC assigner gets no GUIDs, then the MAC assigner needs another cycle of the query for the query-ID and the query-ID is still at an active state.

The MAC assigner may initialize a loop of query for the active query-ID until virtually all of the query-IDs enter inactive states which may mean that the MAC assigner has got virtually all of the GUIDs of the MAC assignees.

The MAC assigner may issue a GUID enrollment request to MAC assignees. Upon receipt of the request, a MAC assignee may wait for a random amount of time and then send a reply. During the random amount of time, the MAC assignee may listen to the BACnet MS/TP network for a reply by another MAC assignee, of which if there is a reply by another MAC assignee, then the MAC assignee may cancel the reply.

If two or more MAC assignees select the same random time and the random time has a minimum value, which is an earliest time for sending a reply, then there may be conflicts in the MS/TP network.

If the MAC assigner receives an invalid message on the BACnet MS/TP network indicating that two or more MAC assignees sent replies at the same time, then a GUID has not necessarily been obtained. If the MAC assigner receives a valid message on the BACnet MS/TP network indicating that just one MAC assignee sent a reply, which means a GUID was obtained, then the MAC assigner may lock the one MAC assignee with the GUID.

If the MAC assigner no longer receives a message in response to the GUID enrollment request to the MAC assignees for replies, then the MAC assigner may have obtained virtually all of the GUIDs of the MAC assignees and virtually all of the GUIDs may be locked with their respective MAC assignees.

An auto addressing system may incorporate a media access control (MAC) assigner having a predefined MAC address and one or more MAC assignees. The assigner and the one or more assignees may be controllers. The assigner may be on a building automation and control network (BACnet) master-slave/token-passing (MS/TP) network. The assigner may obtain a global unique identity (GUID) of each of the one or more assignees. The assigner may seek to obtain one or more unused MAC addresses from the network. The assigner may map the GUID of each of the one or more assignees to an unused MAC address into a map. The MAC addresses may be automatically assigned to the one or more assignees according to the map. The GUID may be unique for virtually all assignees.

One unused MAC address may be obtained from the network to be an interim address for virtually all of the one or more assignees until a non-interim address is assigned to the one or more assignees. The assigner and the one or more assignees may be BACnet devices.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A building automation and control network (BACnet) master-slave/token-passing (MS/TP) automatic media access control (MAC) addressing system comprising:
a BACnet MS/TP network;
a MAC assigner on the network; and
one or more MAC assignees on the network; and
wherein:
each assignee has a global unique identity (GUID);
the assigner has a pre-defined address;
the assigner gathers virtually all GUIDs of the MAC assignees on the network;
the assigner gathers virtually all unused MAC addresses on the network;
the assigner maps GUIDs to the unused MAC addresses; and
the assigner sends a resulting map to the MAC assignees for assignment of a MAC address to each assignee.

2. The system of claim 1, wherein:
each assignee is assigned a MAC address according to its GUID; and
the assignment of a MAC address to each assignee occurs automatically without manual intervention.

3. The system of claim 2, wherein the assigner checks the network to verify that the MAC addresses are assigned properly.

4. The system of claim 3, wherein:
one device is designated as a MAC assigner; and
other devices are designated as MAC assignees.

5. The system of claim 3, wherein:
each of the assignees locks a MAC address into a memory; and
each MAC assignee is restarted to make the MAC address take effect.

6. The system of claim 1, wherein the assigner gathers virtually all of the GUIDs of the MAC assignees automatically.

7. The system of claim 1, wherein:
one MAC address is selected as an interim MAC address;
the interim MAC address is a MAC address for virtually all MAC assignees;
a MAC assignee acts as a slave device; and
slave devices cannot initialize a message on the network and can only reply to a request from the MAC assigner.

8. The system of claim 7, wherein:
the assigner issues a series of query requests to assignees having an interim address;
each query request comprises a query-identity (ID); and
the query-ID requests virtually all MAC assignees whose GUID or a portion of the GUID matches the query-ID to report their GUIDs to the assigner.

9. The system of claim 7, wherein:
the MAC assigner issues a GUID enrollment request to MAC assignees;
upon receipt of the request, a MAC assignee waits for a random amount of time and then sends a reply; and
during the random amount of time, the MAC assignee listens to the BACnet MS/TP network for a reply by another MAC assignee, of which if there is a reply by another MAC assignee, then the MAC assignee cancels the reply.

10. A method for automatic addressing comprising:
providing a media access control (MAC) assigner, having a pre-determined MAC address, on a building automation and control network (BACnet) master-slave/token-passing (MS/TP) network; and
providing one or more MAC assignees, having global unique identities, on the BACnet MS/TP network; and
wherein:
the MAC assigner gathers the GUIDs of the MAC assignees;
the MAC assigner gathers the unused MAC addresses from the BACnet MS/TP network;
the MAC assigner maps GUIDs to unused addresses into a map;
the MAC assigner sends the map to the MAC assignees as an assignment of a MAC address to each MAC assignee;
the MAC assigner verifies that the MAC addresses are properly assigned; and
after assignment of the MAC addresses, the MAC assignees lock their MAC addresses into their respective memories.

11. The method of claim 10, further comprising:
adding a new MAC assignee to the BACnet MS/TP network; and
wherein:
the MAC assigner gathers the GUID from the new MAC assignee;
the MAC assigner gathers an unused MAC address from the BACnet MS/TP network;
the MAC assigner maps the GUID of the new MAC assignee to the unused MAC address into a map;
the MAC assigner sends the map to the new MAC assignee;
the MAC assigner checks the BACnet MS/TP network to verify that the MAC address is properly assigned; and the new MAC assignee locks the MAC address into its memory.

12. The method of claim 10, wherein the MAC assigner gathers the GUIDs on the BACnet MS/TP network automatically.

13. The method of claim 10, wherein virtually all of assignees' GUIDs are manually input to the MAC assigner.

14. The method of claim 10, wherein gathering GUIDs on the BACnet MS/TP comprises the MAC assigner selecting an unused MAC address in the BACnet MS/TP network as an interim MAC address for virtually all of the MAC assignees.

15. The method of claim 14, wherein:
the MAC assigner issues a query to assignees having the interim MAC address; and
the query requests MAC assignees having at least a portion of their GUID matching a query-identity (ID), to report their GUIDs to the MAC assigner.

16. The method of claim 15, wherein:
if the MAC assigner gets virtually all of the matched GUIDs, then the query for the query-ID is complete and the query-ID enters an inactive state;
if the MAC assigner gets some matched GUIDs, then the MAC assigner needs another cycle of the query for the query-ID and the query-ID is still at an active state; and
if the MAC assigner gets no GUIDs, then the MAC assigner needs another cycle of the query for the query-ID and the query-ID is still at an active state.

17. The method of claim 16, wherein the MAC assigner initializes a loop of query for the active query-ID until virtually all of the query-IDs enter inactive states which means that the MAC assigner has got virtually all of the GUIDs of the MAC assignees.

18. The method of claim 14, wherein:
the MAC assigner issues a GUID enrollment request to MAC assignees;
upon receipt of the request, a MAC assignee waits for a random amount of time and then sends a reply; and
during the random amount of time, the MAC assignee listens to the BACnet MS/TP network for a reply by another MAC assignee, of which if there is a reply by another MAC assignee, then the MAC assignee cancels the reply.

19. The method of claim 16, wherein if two or more MAC assignees select the same random time and the random time has a minimum value, which is an earliest time for sending a reply, then there are conflicts in the MS/TP network.

20. The method of claim 18, wherein:
if the MAC assigner receives an invalid message on the BACnet MS/TP network indicating that two or more MAC assignees sent replies at the same time, then a GUID has not been obtained; and
if the MAC assigner receives a valid message on the BACnet MS/TP network indicating that just one MAC assignee sent a reply, which means a GUID was obtained, then the MAC assigner locks the one MAC assignee with the GUID.

21. The method of claim 20, wherein if the MAC assigner no longer receives a message in response to the GUID enrollment request to the MAC assignees for replies, then the MAC assigner has obtained virtually all of the GUIDs of the MAC assignees and virtually all of the GUIDs are locked with their respective MAC assignees.

22. An auto addressing system comprising:
a media access control (MAC) assigner having a predefined MAC address; and
one or more MAC assignees; and
wherein:
the assigner is on a building automation and control network (BACnet) master-slave/token-passing (MS/TP) network;
the assigner obtains a global unique identity (GUID) of each of the one or more assignees;
the assigner seeks to obtain one or more unused MAC addresses from the network;
the assigner maps the GUID of each of the one or more assignees to an unused MAC address into a map; and
the MAC addresses are automatically assigned to the one or more assignees according to the map.

23. The system of claim 22, wherein the GUID is unique for virtually all assignees.

24. The system of claim 22, wherein one unused MAC address is obtained from the network to be an interim address for virtually all of the one or more assignees until a non-interim address is assigned to the one or more assignees.

25. The system of claim 22, wherein the assigner and the one or more assignees are BACnet devices.

* * * * *